United States Patent [19]  
Watanabe

[11] Patent Number: 4,621,114  
[45] Date of Patent: Nov. 4, 1986

[54] PROPYLENE RESIN COMPOSITION  
[75] Inventor: Junichi Watanabe, Nagoya, Japan  
[73] Assignee: Mitsui Petrochemical Industries, Ltd., Tokyo, Japan  
[21] Appl. No.: 626,920  
[22] Filed: Jul. 2, 1984  
[30] Foreign Application Priority Data  
Jul. 4, 1983 [JP] Japan ................ 58-120286  
[51] Int. Cl.$^4$ .................. C08K 3/34; C08L 53/00  
[52] U.S. Cl. ................... 524/451; 524/505; 525/88  
[58] Field of Search .............. 525/88; 524/505, 451  
[56] References Cited  
U.S. PATENT DOCUMENTS  
4,153,587  5/1979  Yui ................................ 525/88  
4,211,690  7/1980  Asano et al. ................... 525/88  
4,312,964  1/1982  Sekine et al. .................. 525/88  
4,363,885 12/1982  Fukui et al. ................... 525/88  
4,439,573  3/1984  Fukui et al. ................... 524/505

FOREIGN PATENT DOCUMENTS  
57-63350  4/1982  Japan ........................... 525/88  
162652   9/1983  Japan ........................... 524/505

Primary Examiner—John C. Bleutge  
Assistant Examiner—Robert E. L. Sellers, II  
Attorney, Agent, or Firm—Wenderoth, Lind & Ponack

[57] ABSTRACT

A propylene resin composition composed of  
(A) 50 to 70% by weight, based on the total weight of (A), (B) and (C), of a propylene-ethylene block copolymer which has an ethylene content of 15 to 35 mole % and a melt flow rate (MFR) of 10 to 60 g/10 min. and in which the propylene component has an isotacticity index of at least 95%,  
(B) 25 to 40% by weight, based on the total weight of (A), (B) and (C), of a random copolymer of ethylene with an alpha-olefin having at least 3 carbon atoms which has an ethylene content of 60 to 85 mole %, a melt flow rate of 0.1 to 2 g/10 min. and a crystallinity, determined by the X-ray method, of not more than 10, and  
(C) 3 to 20% by weight, based on the total weight of (A), (B) and (C), of talc powder having an average particle size of 0.1 to 5 microns.

2 Claims, No Drawings

PROPYLENE RESIN COMPOSITION

This invention relates to a propylene resin composition having excellent properties such as impact strength, rigidity, lacquer-bonding properties and practical shapability (including the prevention of flow marks) of shaped articles in a well-balanced combination. This resin composition is useful in end uses where the above properties are desired, particularly in the field of such shaped articles as an automobile bumper which require the above properties in a well-balanced combination.

More specifically, this invention relates to a propylene resin composition composed of (A) 50 to 70% by weight, based on the total weight of (A), (B) and (C), of a propylene-ethylene block copolymer which has an ethylene content of 15 to 35 mole % and a melt flow rate (MFR) of 10 to 60 g/10 min. and in which the propylene component has an isotacticity index of at least 95%, (B) 25 to 40% by weight, based on the total weight of (A), (B) and (C), of a random copolymer of ethylene with an alpha-olefin having at least 3 carbon atoms which has an ethylene content of 60 to 85 mole %, a melt flow rate of 0.1 to 2 g/10 min. and a crystallinity, determined by the X-ray method, of not more than 10%, and (C) 3 to 20% by weight, based on the total weight of (A), (B) and (C), of talc powder having an average particle size of 0.1 to 5 microns.

Crystalline polypropylene has excellent rigidity, heat resistance and gloss, but has the defect of poor impact strength and lacquer-bonding properties. Hence, its utilization in shaped articles requiring high impact strength or shaped articles which have to be coated is very much restricted.

Attempts have been made to improve the impact strength of the crystalline polypropylene by using ethylene as a comonomer and preparing a propylene-ethylene block copolymer. These attempts have resulted in an improvement in impact strength at room temperature or temperatures near it, but failed to improve low-temperature impact strength.

Japanese Laid-Open Patent Publication No. 64257/1978 (laid-open on June 8, 1978; corresponding to Derwent No. 50902A) suggested the provision of a propylene resin composition having improved low-temperature impact strength. This patent document discloses a resin composition having improved low-temperature impact strength composed of 50 to 90% by weight of a crystalline ethylenepropylene block copolymer having an ethylene content of not more than 20% by weight and a melt flow index (or melt flow rate) of 0.5 to 10, 5 to 20% by weight of an amorphous ethylene/alpha-olefin copolymer having an MFR of 0.2 to 10 and 5 to 40% by weight of talc having an average particle size of 0.5 to 10 microns. The resin composition suggested by this patent document, which is discussed as prior art in Japanese Laid-Open Patent Publication No. 159841/1982 (laid-open on Oct. 2, 1982; corresponding to U.S. Pat. No. 4,412,016) to be cited hereinbelow, has unsatisfactory lacquer-bonding properties, and shaped articles obtained from the composition have unsatisfactory gloss and develop undesirable flow marks.

Attempts to overcome such troubles are disclosed in Japanese Laid-Open Patent Publication No. 55952/1982 (laid-open on Apr. 3, 1982; corresponding to U.S. Pat. No. 4,363,885) and Japanese Laid-Open Patent Publication No. 111846/1983 (laid-open on July 4, 1983; corresponding to U.S. Pat. No. 4,439,573) in addition to the above-cited Japanese Laid-Open Patent Publication No. 159841/1982.

These three patent documents propose propylene resin compositions consisting essentially of components having different properties or different amounts of components. These compositions, however, commonly have as an essential parameter a combination of a crystalline ethylene-propylene block copolymer having a polymerized ethylene content in the range of from 5% to 10% by weight, an amorphous ethylene-propylene copolymer and fine particles of talc. U.S. Pat. Nos. 4,412,016 and 4,363,885 cited above state that with regard to the above block copolymer, an ethylene content of more than 10% by weight causes the restricted shaped article to exhibit an unsatisfactory flexural modulus of elasticity under the combination parameters described in these patents. Furthermore, U.S. Pat. No. 4,439,573 states that with regard to the block copolymer, an ethylene content of more than 10% by weight causes the resultant shaped article to exhibit decreased rigidity under the combination parameter described there.

With these prior techniques, too, it is difficult to provide a propylene resin composition having satisfactory rigidity such as an initial flexural modulus of elasticity, practical impact strength including both low-temperature Izod impact strength and falling dart impact strength (including that determined by a ribbed rectangular plate test), practical lacquer-bonding properties including those determined by a crosscut tape test and a peel test, and practical shapability including the prevention of flow marks in a well balanced combination.

The present inventors have made investigations in order to develop a propylene resin composition which is excellent in the aforesaid desirable properties and has such properties in a well-balanced combination. These investigations have led to the discovery that a propylene resin composition composed of the components (A), (B) and (C) described above is excellent in these desirable properties and possesses them in a well-balanced combination.

It is an object of this invention therefore to provide an improved propylene resin composition.

The propylene-ethylene block copolymer (A) used in the composition of this invention meets the following conditions (a-1) to (a-3).

(a-1) It should have an ethylene content of 15 to 35 mole %, preferably 15 to 25 mole %.

(a-2) It should have a melt flow rate (MFR), determined by ASTM D1238, L, of 10 to 60 g/10 min., preferably 15 to 30 g/10 min.

(a-3) Its propylene component should have an isotacticity index (I.I.), which denotes the amount in % by weight of a boiling n-heptane-insoluble portion, of at least 95%.

Preferred examples of the block copolymer (A) are propylene-ethylene block copolymers obtained by the block copolymerization of propylene and ethylene and composed of 75 to 90% by weight, preferably 80 to 85% by weight, of (I) polypropylene having an I.I. of at least 95%, 1 to 15% by weight, preferably 5 to 12% by weight, of a propylene ethylene copolymer (II) having a propylene content of 20 to 80 mole %, preferably 40 to 80 mole % and especially preferably having a microisotacticity (determined by $^{13}$C-NMR) of at least 0.8, and 5 to 25% by weight, preferably 8 to 18% by weight, of polyethylene (III) having an intrinsic viscosity, determined at 135° C. in decalin, of at least 2.0 dl/g, for example 2.0 to 25.0 dl/g, preferably 2.0 to 5.0 dl/g, and/or an ethylene-propylene copolymer (IV) having a propylene content of not more than 10 mole %.

Such block copolymers (A) and methods for production thereof are known, and can be utilized in this invention. Such block copolymers (A) can also be commercially available. An example of such a known method is a method for producing a non-polymer blend-type propylene-ethylene block copolymer which comprises polymerizing propylene and ethylene in a multiplicity of steps in one polymerization system in the presence of a Ziegler-type stereospecific catalyst or a Ziegler-type stereospecific catalyst composed of a carrier-supported transition metal compound and an organoaluminum compound. Various other known methods are available, and for example, those described in Japanese Laid-Open Patent Publication No. 98045/1977 (U.S. Pat. No. 4,128,606) and Japanese Patent Publication No. 26613/1982 (British Patent No. 1,566,391) can be cited.

The block copolymers (A) may be used singly or as a mixture. In the latter case, the component (A) composed of a mixture of such block copolymers should meet the aforesaid conditions (a-1) to (a-3). The ethylene content in this invention is measured by the $^{13}$C-NMR method. The isotacticity index (I.I.) denotes the amount in weight % of a boiling n-heptane-insoluble portion. The intrinsic viscosity $[\eta]$ is measured in decalin at 135° C.

If the ethylene content of the block copolymer (A) is less than 15 mole % in condition (a-1), the practical impact strength is reduced. If it exceeds 35 mole %, the rigidity and the practical lacquer-bonding properties become inferior. If the MFR of the block copolymer (A) is lower than the specified limit in condition (a-2), the melt flowability of the resulting composition is reduced and it has poor shapability. If it exceeds the upper limit specified, shaped articles from the resulting composition have unsatisfactory mechanical strength. If the I.I. of the block copolymer (A) is below the specified limit in condition (a-3), the rigidity is reduced.

If the amount of the propylene-ethylene copolymer (II) in the above-cited preferred block copolymer composed of (I), (II) and (III) and/or (IV), the impact strength is sometimes inferior. On the other hand, if it exceeds 15% by weight, the rigidity is sometimes reduced. The copolymer component (II) preferably has a microisotacticity of at least 0.8 because the resulting composition is free from stickiness. If the amount of the polyethylene (III) or the ethylene-propylene copolymer component (IV) is less than 5% by weight, the impact strength is sometimes inferior. On the other hand, if this amount exceeds 25% by weight, the rigidity is sometimes reduced. The polyethylene (III) or the ethylene-propylene copolymer (IV) preferably has an intrinsic viscosity of at least 2.0 dl/g because it produces a superior effect of improving mechanical strength.

The random copolymer (B) of ethylene with an alpha-olefin having at least 3 carbon atoms used in the composition of this invention meets the following conditions (b-1) to (b-3).

(b-1) It should have an ethylene content of 60 to 85 mole %, preferably 75 to 82 mole %.

(b-2) It should have an MFR, determined by ASTM D1238, L, of 0.1 to 2 g/10 min., preferably 0.2 to 1 g/10 min.

(b-3) It should have a crystallinity, determined by the X-ray method [see S. Krimm et al., Journal of Polymer Science, Vol. 7, (1), pages 57–76 (1951)], of not more than 10%, preferably not more than 5%, for example 0 to 10%, preferably 0 to 5%.

Such a random copolymer (B) of ethylene with an alpha-olefin having at least 3 carbon atoms and methods for its production are known, and can be used in this invention. The random copolymer (B) may also be commercially available. The random copolymer (B) can be produced, for example, by using a catalyst composed of a vanadium compound and an organoaluminum compound. Specifically, it can be produced, for example, by adding vanadium oxytrichloride to hexane as a solvent, dissolving a gaseous mixture of ethylene and an alpha-olefin to saturation in the solution, adding a solution of ethyl aluminum sesquichloride in hexane, and then polymerizing ethylene and the alphaolefin.

If the ethylene content of the random copolymer (B) is below the limit specified in condition (b-1), the melt flowability of the resulting composition is reduced and it has poor shapability. If the ethylene content is higher than the specified limit, the aforesaid practical impact strength becomes unsatisfactory. If the MFR of the random copolymer (B) is lower than the specified limit in condition (b-2), an adverse effect is exerted on the melt flowability and shapability of the resulting composition. If it is larger than the specified limit, the aforesaid practical impact strength is only unsatisfactorily improved. If the crystallinity of the random copolymer (B) is higher than 10%, the melt flowabilty and shapability of the resulting composition are reduced.

Examples of the alpha-olefin as a comonomer in the random copolymer (B) are $C_3-C_6$ alpha-olefins such as propylene, 1-butene, 1-hexene and 4-methyl-1-pentene. The copolymer (B) may also have a small amount of diene monomer such as dicyclopentadiene, ethylidenenorbornene or 1,4-hexadiene copolymerized therewith.

The talc powder (C) utilized in this invention has an average particle size of 0.1 to 5 microns, preferably about 1 to about 3 microns. If its average particle size is larger than the specified limit, the mechanical strength tends to be reduced. If it is smaller than the specified limit, the uniform dispersion of the talc powder is inhibited in kneading it with the components (A) and (B). If desired, the talc powder (C) may be treated with a suitable surface treating agent. This treatment serves to increase the affinity of the talc powder for the components (A) and (B). Such surface treating agents are known, and include, for example, organic titanate-type coupling agents, silane-type coupling agents and carboxylic acidmodified polyolefins.

The propylene resin composition of this invention is composed of 50 to 70% by weight, preferably 55 to 65% by weight, of the block copolymer (A), 25 to 40% by weight, preferably 28 to 37% by weight, of the random copolymer (B) and 3 to 20% by weight, preferably 5 to 10% by weight, of talc powder (C), all based on the total weight of components (A), (B) and (C). To have the desirable properties in a well balanced combination, the propylene resin composition preferably has an MFR of 5 to 15 g/10 min.

If the amount of the block copolymer (A) is lower than the above-specified limit, an adverse effect is exerted on rigidity. If it is larger than the specified limit, the resulting composition has poor practical lacquer-bonding properties and practical impact strength. If the amount of the random copolymer (B) is below the specified limit, the aforesaid practical impact strength and lacquer-bonding properties are reduced. If it exceeds the specified limit, the rigidity of a shaped article prepared from the resulting composition becomes unsatisfactory. If the amount of the talc powder (C) is below the specified limit, no improvement in rigidity can be obtained. If it exceeds the specified limit, the composition becomes brittle and has reduced practical impact strength.

The propylene resin composition of this invention can be prepared by mixing the components (A), (B) and (C) and as desired, various additives to be described below as uniformly as possible. Mixing means themselves of such a resin composition are known, and can be used in this invention. For example, the aforesaid components are mixed by a Henschel mixer, a V-blender, a ribbon blender or a tumbler blender, and thereafter melt-kneaded by a single screw extruder, a multi-screw extruder, a kneader, or a Bunbury mixer. The melt-mixing temperature can be properly chosen, and may, for example, be about 180° C. to about 260° C. The use of a mixer having superior kneading properties, such as a multi-screw extruder, a kneader, or a Bunbury mixer, is preferred.

The propylene resin composition of this invention may further include various conventional additives in addition to the essential components (A), (B) and (C). The additives include antioxidants such as tetrakis[methylene-( 3,5-di-tert.butyl-4-hydroxy)hydrocinnamate]methane, tri(mono- or di-nonylphenyl) phosphite or 2,6-di-tert.-butyl p-cresol; ultraviolet light absorbers such as 2-(2'-hydroxy-3'-tert.butyl-5'-methylphenyl)-5-chlorobenzotriazole or bis-(2,2,6,6-tetramethyl-4-piperidyl) sebacate; lubricants such as calcium stearate or synthetic hydrotalcite; nucleating agents such as aluminum hydroxy-di-para-tert.-butylbenzoate or aluminum benzoate; antistatic agents such as stearyl monoglyceride; flame retardants such as ethylenebis[tris-(2-cyanoethyl)-phosphoniumbromide], ammonium polyphosphate or antimony trioxide; colorants such as isoindolenone-type colorants, quinacridone- type colorants, cyanine-type colorants or carbon black; and inorganic or organic fillers such as calcium carbonate, barium sulfate or mica.

Other resins having compatibility with the composition of this invention may be incorporated so long as they do not adversely affect the improved properties of the composition. The incorporation of a resin having poor compatibility, such as high-density polyethylene having a density of not less than 0.95 g/cm$^3$, is not desirable.

The amounts of these additives may be properly selected, and for example, based on the total weight of components (A) and (B), may be about 0.05 to 0.8% by weight for the antioxidants, about 0.05 to about 1.5% by weight for the ultraviolet absorbers, about 0.05 to about 0.5% by weight for the lubricants, about 0.05 to about 0.5% by weight for the nucleating agents, about 0.05 to about 1% by weight for the antistatic agents, about 5 to about 40% by weight for the fire retardants, about 0.3 to about 20% by weight for the colorants, and about 0.3 to about 20% by weight for the fillers.

The propylene resin composition of this invention has satisfactory rigidity such as an initial flexural modulus of elasticity, practical impact strength including both low-temperature Izod impact strength and falling dart impact strength (including that determined by a ribbed rectangular plate test), practical lacquer-bonding properties including those determined by a crosscut tape test and a peel test, and practical shapability including the prevention of flow marks in a well-balanced combination.

Because of the above properties, the composition of this invention is especially suitable for production of large-sized shaped articles such as automobile interior and exterior furnishings such as bumpers, spoilers, side protectors, radiator grilles and trims. It is also suitable for producing housings of electrical appliances (such as washing tanks for washers, panels, back covers of television sets, etc.).

The following examples illustrate the present invention more specifically. It should be understood that the invention is not limited in any way by these examples.

The various properties given in the examples were determined by the following methods.

(1) Melt flow rate, MFR (g/10 min.)

In accordance with ASTM D1238, L.

(2) Initial flexural modulus of elasticity (kg/cm$^2$)

In accordance with ASTM D790 at −30° C.

(3) Brittleness temperature (° C.)

In accordance with ASTM D746

(4) Izod impact strength (kg.cm/cm)

In accordance with ASTM D256 at −30° C.

(5) Flow marks

A mold for a simulated bumper (length 460 mm, width 120 mm, height 56 mm; four ribs attached to the back surface of the bumper, thickness 3 mm) was attached to an injection molding machine (N400 manufactured by Nippon Seikosho Co., Ltd.; clamping pressure 400 tons), and simulated bumper was produced by molding the resin composition under an injection pressure of 800 kg/cm$^2$ (primary) and 500 kg/cm$^2$ (secondary) at an injection speed of 24 mm/sec. while the temperature of the resin was maintained at 200° C. The flow marks and gloss of the surface of the molded bumper were evaluated on the following scale.

| Rating | Condition (by visual observation) |
| --- | --- |
| 5 | No flow mark nor uneven gloss. |
| 4 | No flow mark, but slight unevenness in gloss on the embossed surface. |
| 3 | Flow marks on the non-embossed surface and slight unevenness in gloss on the embossed surface |
| 2 | Flow marks and uneven gloss on the entire surface |
| 1 | Extremely marked flow marks and uneven gloss on the entire surface |

(6) Lacquer-bonding properties

A test sample was washed for 30 seconds with a vapor of 1,1,1-trichloroethane, and then coated with Primer P401 (a product of Mitsui Petrochemical Industries Ltd.) for coating polypropylene to a thickness of 10 microns. The coated sample was dried at room temperature and then coated with a two-package urethan paint (a product of Nippon Bel Chemical Co., Ltd.) to a thickness of 25 microns. The coated sample was dried at 90° C. for 30 minutes and then left to stand at room temperature for 12 hours. The sample was then subjected to the following tests.

Crosscut tape test

One hundred squares (1 mm×1 mm) were provided on the coated layer of the sample by means of a cutter. An adhesive Cellophane tape was applied to the cut surface and abruptly peeled off. The number of squares remaining on the coated layer was counted (×/100).

Delamination strength

The coated layer of the sample was cut at a width of 1 cm. It was bent at an angle of 180° and pulled at a speed of 50 mm/min. by a universal tester. The maximum strength required for peeling was determined (g/cm).

(7) Heat sagging property

A test sample, 150×25×2 mm, was used. A 50 mm portion of the sample in its longitudinal direction was fixed horizontally, and the remaining 100 mm portion was kept overhanging. In this state, the sample was placed horizontally in a constant temperature vessel kept at 120° C. and maintained there for 1 hour. Then, it was withdrawn from the vessel, and left to stand at room temperature for 30 minutes. Then, the amount (mm) of the end of the sample which sagged was measured.

(8) Falling dart impact strength (kg-cm)

(1) Falling dart impact test

Rectangular plates, 12×13×0.3 (thickness) cm, prepared by injection molding were used, and a dart having a weight of 3 kg and a round tip with a diameter of 1.27 cm was let fall onto the rectangular plates. The energy of impact was varied by varying the height of falling, and the energy which caused destruction of 50% of the samples was determined.

(2) Falling dart impact test using ribbed rectangular plates.

The procedure of 1) was repeated except that the samples used were ribbed rectangular plates, 12×13×0.4 (thickness) cm (the basic thickness was 0.3 cm, and ribbs having a height of 0.1 cm were attached in a lattice form of 0.3×0.3 cm).

EXAMPLE 1

60% by weight of a propylene-ethylene block copolymer (abbreviated as PEB-I) having an ethylene content of 17 mole % and an MFR of 20 g/10 min. and composed of 82.6% by weight of a polypropylene component having an I.I. of 97, 7.7% by weight of a propylene-ethylene copolymer component having a propylene content of 60 mole % and an intrinsic viscosity of 3 dl/g and 9.7% by weight of a polyethylene component having an intrinsic viscosity of 3.3 dl/g; 33% by weight of an ethylene-propylene random copolymer (to be abbreviated as EPR) having an ethylene content of 81.0 mole %, an MFR of 0.4 g/10 min. and a crystallinity of 3%; 7% by weight of talc (Micron White 5000P, a trade name for a product of Hayashi Chemical Co., Ltd.); and per 100 parts by weight of PEB-I+EPR-+talc, 1 part by weight of carbon black, 0.1 part by weight of Yoshinox BHT (a trade name for a product of Yoshitomi Pharmaceutical Co., Ltd.) and 0.1 part by weight of Irganox 1010 (a trade name for a product of Musashino Geigy Co., Ltd.) as heat stabilizers were mixed by a Henschel mixer. The mixture was then granulated by a twin-screw extruder (ZSK53L, a product of Werner & Pfleiderer) while the temperature of the resin was maintained at 220° C. Thus, composition I was obtained.

The composition I was then injection-molded by an injection molding machine (Dynamelter SJ-450, a product of Meiki Seisakusho Co., Ltd.; clamping pressure 140 tons) while the temperature of the resin was maintained at 200° C.

COMPARATIVE EXAMPLE 1

Example 1 was repeated except that 60% by weight of a propylene-ethylene block copolymer (to be abbreviated as PEB-II) having an ethylene content of 30 mole % and an MFR of 5.5 g/10 min. and composed of 75.2% by weight of a polypropylene component having an I.I. of 97, 4.0% by weight of a propylene-ethylene copolymer component having a propylene content of 60 mole % and an intrinsic viscosity of 3 dl/g and 20.8% by weight of a polyethylene component having an intrinsic viscosity of 2.2 dl/g was used instead of PEB-1 used in Example 1, and the amounts of EPR and talc were changed respectively to 30% by weight and 10% by weight. The results are shown in Table 1.

COMPARATIVE EXAMPLE 2

Example 1 was repeated except that a propylene-ethylene block copolymer (to be abbreviated as PEB-III) having an ethylene content of 12 mole % and an MFR of 23 g/10 min. and composed of 85.2% by weight of a polypropylene component having an I.I. of 97, 9.0% by weight of a propylene-ethylene copolymer component having a propylene content of 60 mole % and an intrinsic viscosity of 3 dl/g and 5.8% by weight of a polyethylene component having an intrinsic viscosity of 3.3 dl/g was used instead of PEB-I used in Example 1. The results are shown in Table 1.

COMPARATIVE EXAMPLE 3

Example 1 was repeated except that 75% by weight of a propylene-ethylene block copolymer (to be abbreviated as PEB-IV) having an ethylene content of 26 mole % and an MFR of 14 g/10 min. and composed of 77.4% by weight of a polypropylene component having an I.I. of 97, 5.1% by weight of a propylene-ethylene copolymer component having a propylene content of 60 mole % and an intrinsic viscosity of 3 dl/g and 17.5% by weight of a polyethylene component having an intrinsic viscosity of 3.3 dl/g was used instead of PEB-I used in Example 1, and the amounts of EPR and talc were changed respectively to 20% by weight and 5% by weight. The results are shown in Table 1.

COMPARATIVE EXAMPLE 4

Example 1 was repeated except that an ethylene/1-butene random copolymer having an ethylene content of 91.5 mole %, an MFR of 6 g/10 min. and a crystallinity of 17% (to be abbreviated as EBR) was used instead of EPR in Example 1. The results are shown in Table 1.

EXAMPLE 2

Example 1 was repeated except that a mixture of 43% by weight of PEB-III used in Comparative Example 2 and 20% by weight of PEB-IV used in Comparative Example 3 (the mixture being composed of 82.9% by weight of a propylene component, 7.8% by weight of a propylene-ethylene copolymer component and 9.3% by weight of a polyethylene component and having an ethylene content of 16.5 mole % and an MFR of 21 g/10 min.) was used instead of PEB-I used in Example 1, and the amounts of EPR and talc were changed respectively to 30% by weight and 7% by weight. The results are shown in Table 1.

EXAMPLE 3

Example 1 was repeated except that a propylene-ethylene block copolymer (to be abbreviated as PEB-V) having an ethylene content of 28 mole % and an MFR of 23 g/10 min. and composed of 74.4% by weight of a polypropylene component having an I.I. of 97, 7.0% by weight of a propylene-ethylene copolymer component having a propylene content of 60 mole % and an intrinsic viscosity of 3 dl/g and 18.6% by weight of a polyethylene component having an intrinsic viscosity of 3.3 dl/g was used instead of PEB-I used in Example 1. The results are shown in Table 1.

EXAMPLE 4

Example 1 was repeated except that 28% by weight of an ethylene-propylene-ethylidenenorbornene terpolymer (to be abbreviated as EPT) having an ethylene content of 78.5 mole %, an ethylidenenorbornene content of 2 mole %, an MFR of 0.3 g/10 min. and a crystallinity of 3% was used instead of EPT used in Example 1, and the amount of PEB-I was changed to 65% by weight. The results are shown in Table 1.

TABLE 1

| Item | Example 1 | Comparative Example 1 | Comparative Example 2 | Comparative Example 3 |
|---|---|---|---|---|
| Composition (wt. %) | PEB-I (60) EPR (33) talc (7) | PEB-II (60) EPR (30) talc (10) | PEB-III (60) EPR (33) talc (7) | PEB-IV (75) EPR (20) talc (5) |
| MFR (g/10 min.) | 7.0 | 3.5 | 7.5 | 6.6 |
| Initial flexural modulus of elasticity (kg/cm$^2$) | 12,200 | 11,500 | 12,500 | 12,800 |
| Izod impact strength −30° C. (kg · cm/cm) | 25 | 28 | 15 | 8 |
| Low-temperature embrittlement temperature (°C.) | −55 | −55 | −50 | −47 |
| Flow marks | 5 | 1 | 3 | 4 |
| Lacquer-bonding properties | | | | |
| Crosscut test (x/100) | 100 | 100 | 100 | 90 |
| Delamination strength (g/cm) | 1200 | 700 | 750 | 400 |
| Heat sagging property (mm) | 5.3 | 7.3 | 5.3 | 5.0 |
| Impact strength | | | | |
| Falling dart (−30° C.; kg-cm) | 430 | 430 | 350 | 330 |
| Falling dart with ribbed samples (−30° C.; kg-cm) | 98 | 96 | 52 | 48 |

| Item | Comparative Example 4 | Example 2 | Example 3 | Example 4 |
|---|---|---|---|---|
| Composition (wt. %) | PEB-I (60) EPR (33) talc (7) | PEB-II (43) PEB-IV (20) EPR (30) talc (7) | PEB-V (60) EPR (33) talc (7) | PEB-I (65) EPT (28) talc (7) |
| MFR (g/10 min.) | 12 | 7.4 | 7.6 | 7.0 |
| Initial flexural modulus of elasticity (kg/cm$^2$) | 13.000 | 12,800 | 11,600 | 12,800 |
| Izod impact strength −30° C. (kg · cm/cm) | 7 | 22 | 28 | 15 |
| Low-temperature embrittlement temperature (°C.) | −40 | −55 | −58 | −55 |
| Flow marks | 2 | 5 | 5 | 5 |
| Lacquer-bonding properties | | | | |
| Crosscut test (x/100) | 100 | 100 | 100 | 100 |
| Delamination strength (g/cm) | 750 | 1150 | 1050 | 1000 |
| Heat sagging property (mm) | 4.8 | 4.8 | 7.0 | 4.6 |
| Impact strength | | | | |
| Falling dart (−30° C.; kg-cm) | 310 | 410 | 450 | 400 |
| Falling dart with ribbed samples (−30° C.; kg-cm) | 43 | 92 | 99 | 91 |

What is claimed is:

1. A propylene resin composition composed of
   (A) 50 to 70% by weight, based on the total weight of (A), (B) and (C), of a propylene-ethylene block copolymer which has an ethylene content of 16.5 to 35 mole % and a melt flow rate (MFR) of 10 to 60 g/10 min. and in which the propylene component has an isotacticity index of at least 95%,
   (B) 25 to 40% by weight, based on the total weight of (A), (B) and (C), of a random copolymer of ethylene with an alpha-olefin having at least 3 carbon atoms which has an ethylene content of 60 to 85 mole %, a melt flow rate of 0.1 to 2 g/10 min. and a crystallinity, determined by the X-ray method, of not more than 10, and
   (C) 3 to 20% by weight, based on the total weight of (A), (B) and (C), of talc powder having an average particle size of 0.1 to 5 microns.

2. The propylene resin composition of claim 1 wherein the random copolymer (B) has a melt flow rate of 0.2 to 1 g/10 min.

* * * * *